United States Patent
Bae et al.

(10) Patent No.: US 12,417,580 B2
(45) Date of Patent: Sep. 16, 2025

(54) METHOD AND APPARATUS FOR FILLING BLANK AREA OF MPI VIEW PLANE BASED ON PIXEL RAY PATH

(71) Applicant: ELECTRONICS AND TELECOMMUNICATIONS RESEARCH INSTITUTE, Daejeon (KR)

(72) Inventors: Seong Jun Bae, Daejeon (KR); Jung Won Kang, Daejeon (KR); Soo Woong Kim, Daejeon (KR); Ji Hoon Do, Daejeon (KR); Gun Bang, Daejeon (KR); Jin Ho Lee, Daejeon (KR); Ha Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 231 days.

(21) Appl. No.: 18/484,181

(22) Filed: Oct. 10, 2023

(65) Prior Publication Data

US 2024/0153198 A1    May 9, 2024

(30) Foreign Application Priority Data

Nov. 7, 2022 (KR) .................. 10-2022-0147402
Sep. 26, 2023 (KR) .................. 10-2023-0129470

(51) Int. Cl.
G06T 15/20 (2011.01)

(52) U.S. Cl.
CPC .......... *G06T 15/20* (2013.01); *G06T 2210/56* (2013.01)

(58) Field of Classification Search
None
See application file for complete search history.

(56) References Cited

U.S. PATENT DOCUMENTS

| 2020/0007914 A1* | 1/2020 | Peng ............... H04M 1/72448 |
| 2022/0239896 A1 | 7/2022 | Xu et al. |
| 2023/0379495 A1* | 11/2023 | Fleureau ............. H04N 19/597 |

FOREIGN PATENT DOCUMENTS

| KR | 20160106045 A | 9/2016 |
| KR | 10-2018-0086773 A | 8/2018 |

(Continued)

OTHER PUBLICATIONS

Zhou et al. ("Stereo Magnification: Learning view synthesis using multiplane images", ACM Trans. Graph., vol. 37, No. 4, Article 65. Publication date: Aug. 2018. (Year: 2018).*

(Continued)

*Primary Examiner* — Kee M Tung
*Assistant Examiner* — Biao Chen
(74) *Attorney, Agent, or Firm* — Rabin & Berdo, P.C.

(57) ABSTRACT

The present invention relates to a method and apparatus for filling a blank area of MPI view plane based on a pixel ray path. A method for generating multi plane image (MPI) data according to an embodiment of the present disclosure may comprise: calculating a pixel value according to each view for each photographed object, based on a plurality of input images photographed from a plurality of views; generating a view plane at a specific point by recording the calculated pixel value on one MPI layer determined based on the spatial position of the corresponding photographed object among a plurality of MPI layers; and generating MPI data by additionally recording the pixel value for the view.

20 Claims, 9 Drawing Sheets

(56) References Cited

FOREIGN PATENT DOCUMENTS

| | | |
|---|---|---|
| KR | 10-2021-0089068 A | 7/2021 |
| KR | 10-2022-0111514 A | 8/2022 |
| WO | 2022/069522 A1 | 4/2022 |

OTHER PUBLICATIONS

Flynn et al., DeepStereo: Learning to Predict New Views from the World's Imagery, arXiv.org, arXiv:1506.06825v1 [cs.CV] Jun. 22, 2015 (Year: 2015).*

* cited by examiner vs.

METHOD AND APPARATUS FOR FILLING BLANK AREA OF MPI VIEW PLANE BASED ON PIXEL RAY PATH

CROSS-REFERENCE TO RELATED APPLICATIONS

This application claims the benefit of earlier filing date and right of priority to Korean Application No. 10-2022-0147402, filed on Nov. 7, 2022 and Korean Application No. 10-2023-0129470, filed on Sep. 26, 2023, the contents of which are all hereby incorporated by reference herein in their entirety.

TECHNICAL FIELD

The present disclosure relates to a method and apparatus for filling blank areas of a multi plane image (MPI) view plane based on a pixel ray path.

BACKGROUND

Multi-plane image (MPI), that is, multi-plane 3-dimension (3D) data, corresponds to a 3D spatial expression method that reconstructs 3D space into a depth direction layer and positions pixels in space on a plane in each depth direction.

The MPI-based spatial expression method may achieve relatively high image quality when freely rendering space at an arbitrary view/viewpoint, but does not require high-quality depth information, which is the most important factor in maintaining image quality when expressing photo-realistic spatial information.

Based on these points, the MPI-based spatial expression method is being used in various ways as a new 3D real-time spatial expression method.

SUMMARY

The technical object of the present disclosure is to provide a method and apparatus for filling blank areas of the MPI view plane based on pixel ray paths.

The technical object of the present disclosure is to provide a method and apparatus for filling blank areas of view values that cause distortion when generating an image from an arbitrary view, when generating plenoptic multi-plane image data with multiple color values depending on the angle of incidence using a multi-view input image.

The technical object of the present disclosure is to provide a method and apparatus for filling color values so that the same color values as the original image may be maintained as much as possible when compositing at an arbitrary view in time, in filling blank areas of the view value on the view plane with color values.

The technical objects to be achieved by the present disclosure are not limited to the above-described technical objects, and other technical objects which are not described herein will be clearly understood by those skilled in the pertinent art from the following description.

A method of generating multi plane image (MPI) data according to an aspect of the present disclosure may comprise: calculating a pixel value according to each view for each photographed object, based on a plurality of input images photographed from a plurality of views; generating a view plane at a specific point by recording the calculated pixel value on one MPI layer determined based on the spatial position of the corresponding photographed object among a plurality of MPI layers, wherein the specific point corresponds to a point where a path between the corresponding photographed object and a view of the recorded pixel value and the one MPI layer are crossed; and generating MPI data by additionally recording the pixel value for the view, which is recorded at the specific point, at a point where the path is crossed with the other MPI layer rather than the one MPI layer.

An apparatus of generating multi plane image (MPI) data according to an additional aspect of the present disclosure may comprise a processor and a memory. The processor is configured to: calculate a pixel value according to each view for each photographed object, based on a plurality of input images photographed from a plurality of views; generate a view plane at a specific point by recording the calculated pixel value on one MPI layer determined based on the spatial position of the corresponding photographed object among a plurality of MPI layers, wherein the specific point corresponds to a point where a path between the corresponding photographed object and a view of the recorded pixel value and the one MPI layer are crossed; and generate MPI data by additionally recording the pixel value for the view, which is recorded at the specific point, at a point where the path is crossed with the other MPI layer rather than the one MPI layer.

As one or more non-transitory computer readable medium storing one or more instructions according to an additional aspect of the present disclosure, the one or more instructions are executed by one or more processors and control an apparatus for generating multi plane image (MPI) data to: calculate a pixel value according to each view for each photographed object, based on a plurality of input images photographed from a plurality of views; generate a view plane at a specific point by recording the calculated pixel value on one MPI layer determined based on the spatial position of the corresponding photographed object among a plurality of MPI layers, wherein the specific point corresponds to a point where a path between the corresponding photographed object and a view of the recorded pixel value and the one MPI layer are crossed; and generate MPI data by additionally recording the pixel value for the view, which is recorded at the specific point, at a point where the path is crossed with the other MPI layer rather than the one MPI layer.

In various aspects of the present disclosure, when the spatial position of the corresponding photographed object exists between two MPI layers, the one MPI layer may correspond to the MPI layer located closer to the view of the recorded pixel value among the two MPI layers.

Additionally, in various aspects of the present disclosure, the view plane may comprise one or more pixel values based on one or more views.

Additionally, in various aspects of the present disclosure, the pixel value for each view may correspond to color value information at each view for each photographed object.

Additionally, in various aspects of the present disclosure, the other MPI layer may correspond to a MPI layer having a smaller layer depth value than the one MPI layer among the plurality of MPI layers.

Additionally, in various aspects of the present disclosure, the pixel value for the view, which is recorded at the specific point, may be additionally recorded when the pixel value for the view is not recorded at the point where the path is crossed with the other MPI layer.

Additionally, in various aspects of the present disclosure, an operation of generating the view plane and an operation of additionally recording the pixel value may be repeatedly performed at points where a plurality of paths determined based on the plurality of views are crossed with the plurality of MPI layers.

Additionally, in various aspects of the present disclosure, the plurality of views may be set based on an M×N camera array or N camera array, and M and N may correspond to positive integers greater than or equal to 1.

Additionally, in various aspects of the present disclosure, the MPI data may correspond to plenoptic multi-plane three-dimensional data having a plurality of different color values depending on the angle of incidence.

According to the present disclosure, a method and apparatus for filling blank areas of the MPI view plane based on pixel ray paths may be provided.

According to the present disclosure, a method and apparatus for filling blank areas of view values that cause distortion when generating an image from an arbitrary view, when generating plenoptic multi-plane image data with multiple color values depending on the angle of incidence using a multi-view input image may be provided.

According to the present disclosure, a method and apparatus for filling color values so that the same color values as the original image may be maintained as much as possible when compositing at an arbitrary view in time, in filling blank areas of the view value on the view plane with color values may be provided.

According to the present disclosure, there is an effect of enabling MPI-based arbitrary view rendering without image distortion due to the view value blank area through a method of filling the viewpoint value blank area.

Effects achievable by the present disclosure are not limited to the above-described effects, and other effects which are not described herein may be clearly understood by those skilled in the pertinent art from the following description.

DETAILED DESCRIPTION

Figure 1:
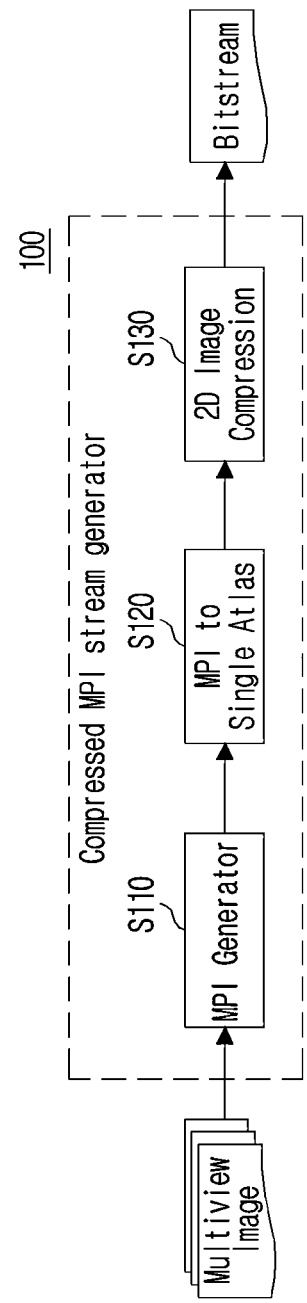
FIG. 1 illustrates an MPI-based compression method that may be applied to the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

Multi-plane image (MPI), that is, multi-plane 3-dimension (3D) data, corresponds to a 3D spatial expression method that reconstructs 3D space into a depth direction layer and positions pixels in space on a plane in each depth direction.

Specifically, in the case of the above-described MPI-based spatial expression method, points are restricted to exist only in plane units by comparing with the point cloud method or voxel method in which each point freely floats/exists at an arbitrary location in space. Through this, a certain level of motion parallax may be expressed even with a small amount of data. In other words, there is an advantage that the view from an arbitrary camera position may be freely rendered.

Additionally, in relation to the MPI-based spatial expression method described above, there may be various methods for generating MPI without depth information using machine learning or the like.

FIG. 1 illustrates an MPI-based compression method that may be applied to the present disclosure.

Referring to FIG. 1, a set of multiview images may be compressed/transformed into a bitstream using a compressed MPI stream generator 100.

In this regard, the compressed MPI stream generator may perform a MPI generation operation (S110), a single atlas transform operation (S120), and a 2D image compression operation (S130).

The multi-view image set may correspond to an original photographed by a multi-view video camera. That is, the multi-view image set may be an original multi-view captured image for MPI generation, and may be a set of images acquired from various view positions using a camera array, etc.

For example, to generate MPI, images taken of scenes at the same time from various locations may be received as input. In general, a multi-view image set may be captured/acquired using M×N two-dimensionally arranged camera arrays or N one-dimensionally arranged camera arrays.

The multi-view image set may be converted to MPI data through an MPI generation operation (S110).

For example, MPI data may be generated based on M×N images taken using a camera array. Through the MPI data generated in this way, images from arbitrary camera positions may be rendered.

Figure 2:
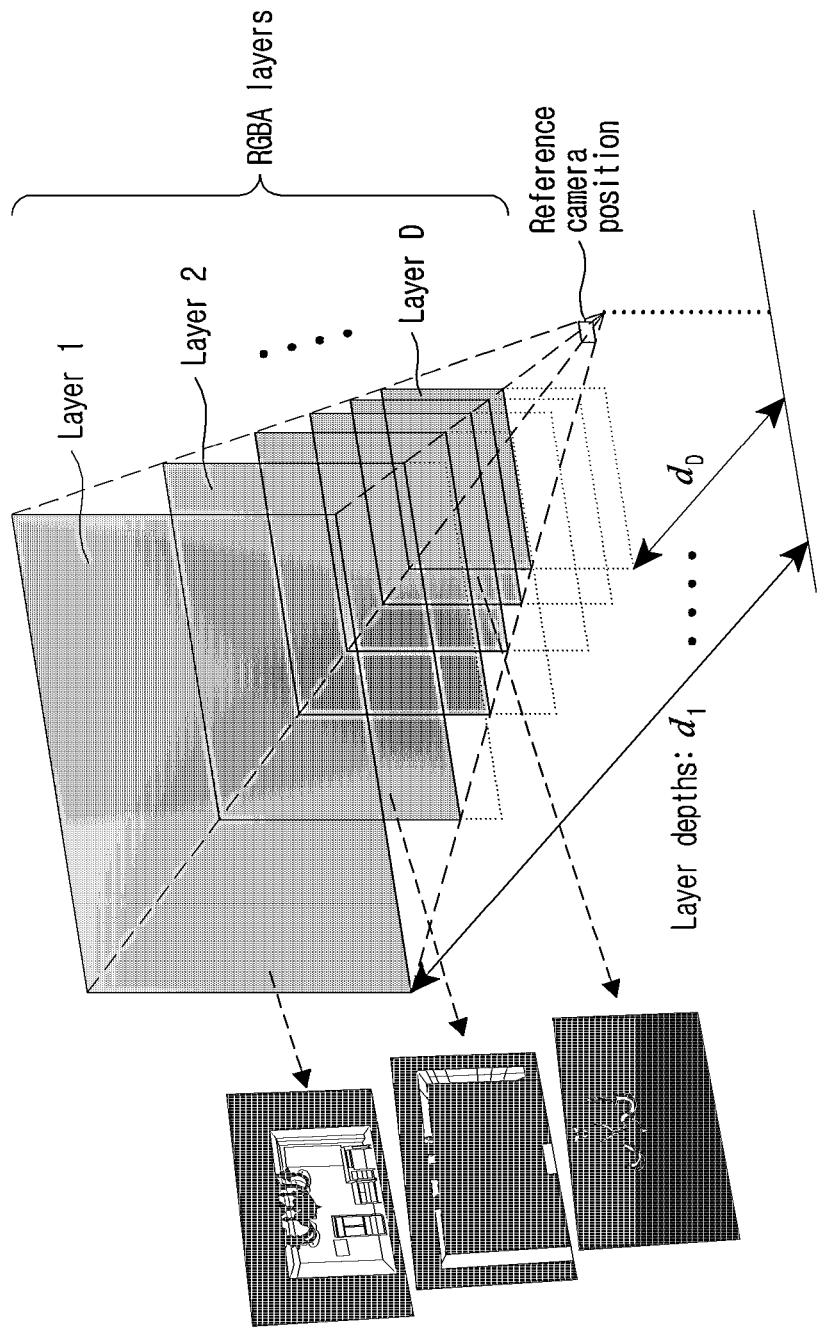
FIG. 2 illustrates a conceptual diagram for generating MPI data that may be applied to the present disclosure.

FIG. 2 illustrates a conceptual diagram for generating MPI data that may be applied to the present disclosure.

Referring to FIG. 2, planes may be generated for each distance in the layer depth direction from a specific camera position, that is, a reference camera position. That is, from layer depth $d_1$ to $d_D$, plane, that is, MPI data may be generated for each layer.

Based on this, a 3D spatial image may be expressed by rearranging the pixel value (e.g., RGB value) and the transparency (e.g., alpha, A) of the corresponding pixel for each plane.

Using the MPI generated in this way, an image at an arbitrary camera position may be generated.

MPI data generated as described above may be converted into an atlas image through a single atlas conversion operation (S120).

As an example, an atlas image may correspond to a 2D image generated by gathering and rearranging areas where pixels exist in all layers of MPI into one image. In this regard, an atlas image recombined into one may be composed of two images sharing the same position of MPI for each pixel, that is, one RGB image and one alpha image.

The converted atlas image may be converted to bitstream through a 2D image compression operation (S130).

For example, an atlas image may be compressed into bitstream (e.g., 0011010110 . . . ) data using one of the (existing) 2D image/video compression scheme (e.g., 2D codec scheme such as HEVC, H.263, VVC, etc.).

The method proposed in the present disclosure is about improving the method of generating MPI data (i.e., the operation S110 in above-described FIG. 1) in relation to the MPI-based compression method.

In other words, the method proposed in the present disclosure corresponds to a scheme that improves the existing method in the step of generating MPI from a multiview image.

In this regard, when generating MPI from a multi-view image, a MPI layer image may be generated from multiple original images.

Figure 3:
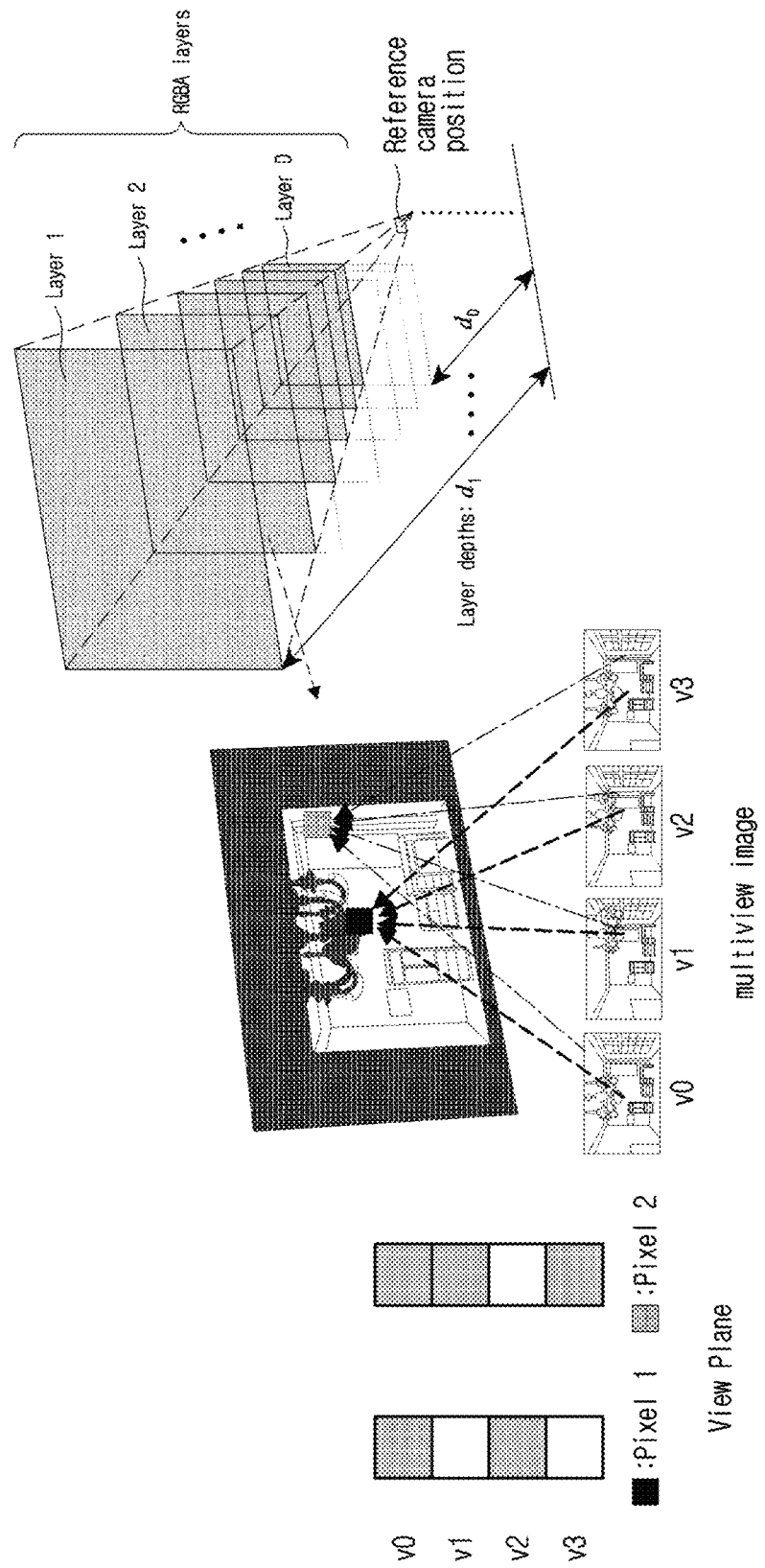
FIG. 3 illustrates a MPI layer image and view plane that may be applied to this disclosure.

FIG. 3 illustrates a MPI layer image and view plane that may be applied to this disclosure.

Referring to FIG. 3, a case in which a MPI layer image is generated by inputting images from four views is illustrated.

Specifically, when generating a MPI layer image from multiple original images, that is, multi-view images, even if the same object location, that is, the same spatial point, is photographed, it may have different color values depending on the viewing angle.

In this way, an additional plane expressing different values depending on the view for the same spatial point may be defined as a view plane.

For example, color values for specific spatial points/positions (eg, pixel 1, pixel 2, etc.) may be different in the first view image, the second view image, the third view image, and the fourth view image.

Here, the first view image may correspond to the original image taken at view v0, the second view image may correspond to the original image taken at view v1, and the third view image may correspond to the original image taken at view v2, and the fourth view image may correspond to the original image taken at view v3.

Therefore, since the input image is according to four views, the view plane at each spatial point may be composed of four values according to views v0 to v3. As a specific example, each view plane for pixel 1 and pixel 2 may be expressed as values at views v0 to v3.

However, the view plane may have a "view value blank area" where no value exists depending on the spatial point.

For example, as in the view plane shown in FIG. 3, at the first spatial point, that is, pixel 1, only color values at views v0 and v2 may exist. In this case, since the color values at views v1 and v3 do not exist, v1 and v3 may correspond to view value blank areas in the corresponding pixel.

Similarly, at the second spatial point, that is, pixel 2, only color values at views v0, v1, and v3 may exist. In this case, since the color value at the view v2 does not exist, v2 may correspond to a view value blank area in the corresponding pixel.

Figure 4:
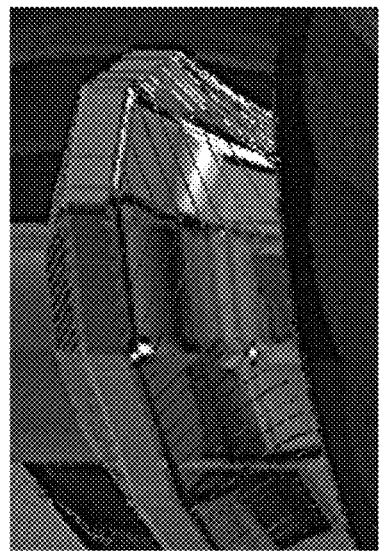
FIG. 4 illustrates distortion resulting from MPI-based composite image generation.
Figure 4:
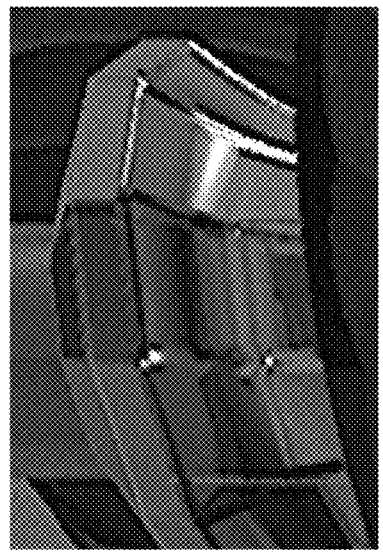

As described above, if there is a view value blank area, distortion as shown in FIG. 4 may occur when reproducing/generating an image from an arbitrary view based on MPI.

FIG. 4 illustrates distortion resulting from MPI-based composite image generation.

Compared to the left image of FIG. 4, the right image illustrates a composite image including an error according to the view value blank area as described above in the present disclosure.

Referring to FIG. 4, when reproducing/generating an image from an arbitrary view based on MPI, if a view value blank area exists, distortion may occur in the composite image.

Hereinafter, in this disclosure, in order to solve the distortion problem described above, a method of filling the "view value blank area" on the viewp plane is proposed through specific examples.

That is, in the present disclosure, when filling the view value blank area in the above-described view plane with a color value, a method for filling view values (i.e., color values) so as to maintain the same color values as the original image as much as possible is provided.

Figure 5:
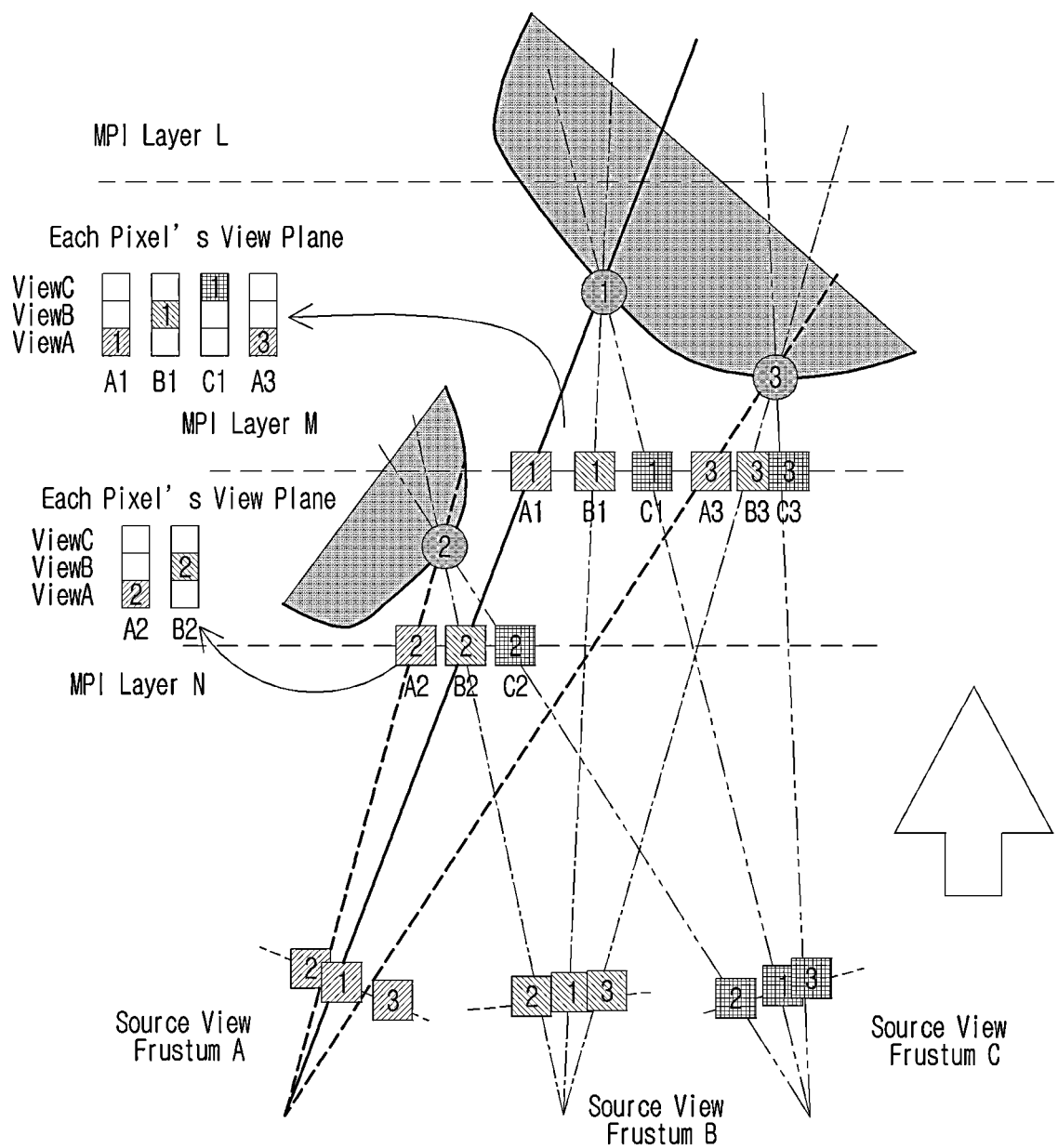
FIG. 5 illustrates an example of a method for generating an MPI view plane according to an embodiment of the present disclosure.

FIG. 5 illustrates an example of a method for generating an MPI view plane according to an embodiment of the present disclosure.

Referring to FIG. 5, a MPI layer may be generated from multi-view images taken from different views for points in space. In FIG. 5, it is assumed that each point is photographed from three views (View A, View B, and View C).

Numbers 1, 2, and 3 shown in circles in FIG. 5 correspond to photographed points in space for explaining MPI layer generation.

Additionally, numbers 1, 2, and 3 shown in squares correspond to points where photographed points in each space are recorded in the MPI layer. At this time, the information recorded in each MPI layer may correspond to color value information captured at each view for the photographed point.

At this time, information on the photographed point existing between the two MPI layers is input/recorded to the MPI layer closest to the shooting point (e.g., camera, etc.) among the two MPI layers.

For example, since photographed point 1 is located between MPI layer M and MPI layer L, information on photographed point 1 is recorded in MPI layer M. In this regard, the point/position at which pixel values are recorded in the MPI layer may be referred to as a recording point.

At this time, the pixel value (i.e., color value) for photographed point 1 in the image captured at view A (hereinafter referred to as input image A) is recorded at the point A1 of the MPI layer M. Similarly, the pixel value for photographed point 1 in the image captured at view B (hereinafter referred to as input image B) is recorded at the point B1 of the MPI layer M. Similarly, the pixel value for photographed point 1 in the image captured at view C (hereinafter referred to as input image C) is recorded at the point C1 of the MPI layer M.

Additionally, since photographed point 2 is located between MPI layer N and MPI layer M, information on photographed point 2 is recorded in MPI layer N.

At this time, the pixel value for photographed point 2 in input image A is recorded at point A2 of MPI layer N. Similarly, the pixel value for photographed point 2 in input image B is recorded at point B2 of MPI layer N. Similarly, the pixel value for photographed point 2 in the input image C is recorded at the point C2 of the MPI layer N.

Additionally, since photographed point 3 is located between MPI layer M and MPI layer L, information on photographed point 3 is recorded in MPI layer M.

At this time, the pixel value for photographed point 3 in input image A is recorded at point A3 of MPI layer M. Similarly, the pixel value for photographed point 3 in input image B is recorded at point B3 of MPI layer M. Similarly, the pixel value for photographed point 3 in the input image C is recorded at point C3 of the MPI layer M.

As described above, based on the recorded pixel values, a view plane may be determined/generated in each MPI layer.

For example, in the case of the view plane at point A1 in MPI layer M, only pixel values for View A exist, and pixel values for View B and View C do not exist. That is, in the case of the view plane at point A1, there is a view value blank area for View B and View C. Similarly, in the case of the view plane at point B1, there is a view value blank area for View A and View C. Similarly, in the case of the view plane at point C1, there is a view value blank area for View A and View B. Similarly, in the case of the view plane at point A3, there is a view value blank area for View B and View C. Similarly, a view value blank area may exist on the view plane for other points where pixel values are located in the MPI layer M.

Additionally, in the case of the view plane at point A2 in MPI layer N, only pixel values for View A exist, and pixel values for View B and View C do not exist. That is, in the case of the view plane at point A2, there is a view value blank area for View B and View C. Similarly, in the case of the view plane at point B2, there is a view value blank area for View A and View C. Similarly, a view value blank area may exist on the view plane for other points where pixel values are located in MPI layer N.

Additionally, in some cases, pixel values obtained from different input images may be input/recorded for one point. That is, multiple pixel values, that is, color values, may be recorded for a specific point on the MPI layer based on different photographed images.

Figure 6:
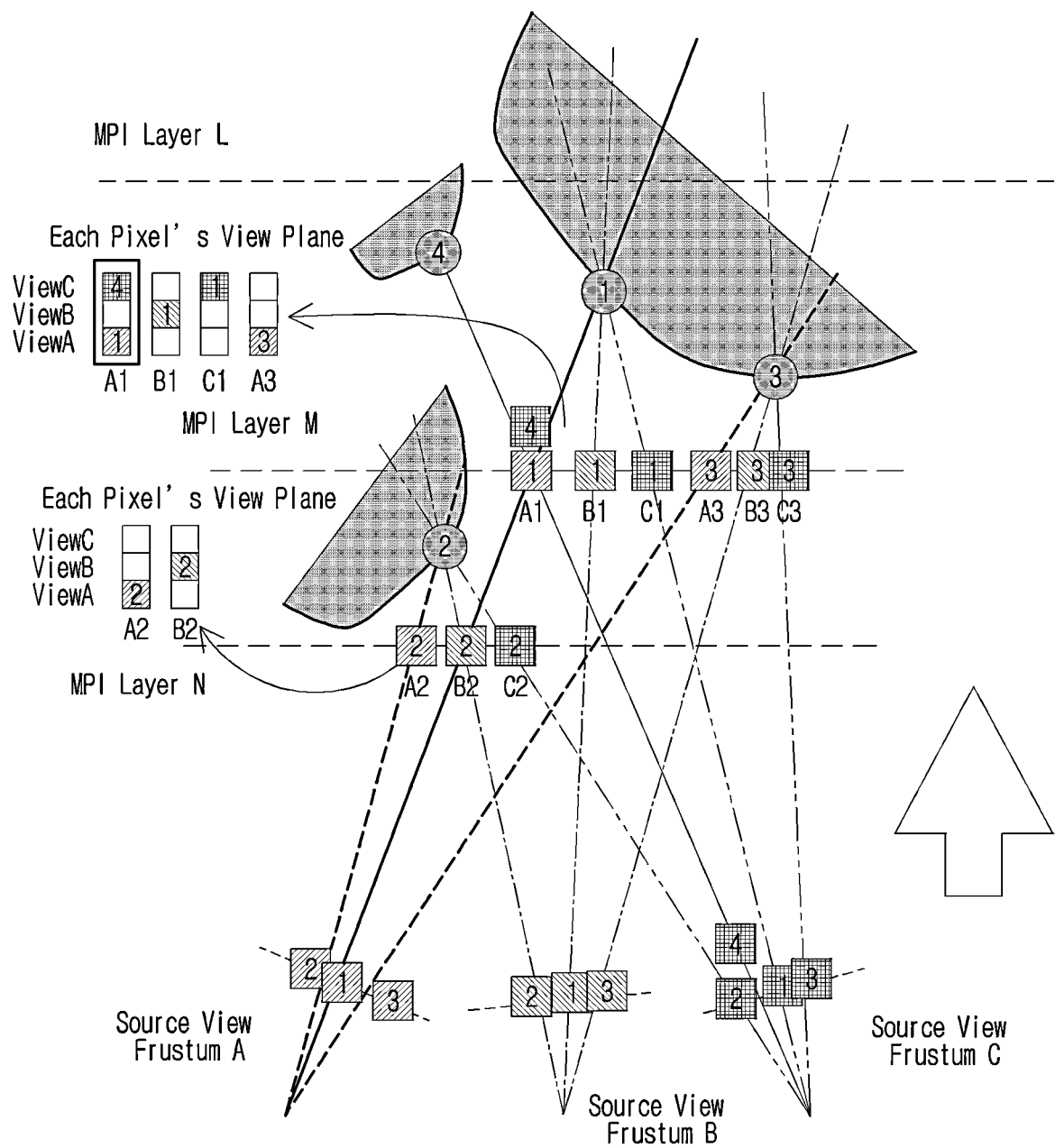
FIG. 6 illustrates an additional example of a method for generating an MPI view plane according to an embodiment of the present disclosure.

FIG. 6 illustrates an additional example of a method for generating an MPI view plane according to an embodiment of the present disclosure.

Referring to FIG. 6, in contrast to the view plane generation described in FIG. 5, a case in which pixel values for an additional photographed point (e.g., photographed point 4) are input/recorded is illustrated.

Specifically, when rays corresponding to multiple views overlap at a specific point where pixel values are recorded in the MPI layer, pixel values based on multiple views may be input/recorded at the specific point.

For example, at point A1 located in MPI layer M, the ray corresponding to the value taken at photographed point 1 from view A (i.e., camera A) and the ray corresponding to the value taken at photographed point 4 from view C (i.e., camera C) overlap.

Therefore, all information based on this may be recorded at the corresponding point A1. That is, as shown in FIG. 6, in the case of the view plane at point A1 in the MPI layer M, the pixel value for View A and the pixel value for View C may be input/recorded at the same time. In this case, compared to the example in FIG. 5, only the pixel value for View B does not exist.

Based on the procedures described in FIGS. 5 and 6, MPI data, that is, MPI viewpoint plane data, may be generated by recording the pixel value at the corresponding point in the MPI layer, for all pixels captured at multiple views (e.g., views A, B, C, etc.).

However, when generating MPI view plane data according to the procedure described in FIGS. 5 and 6, there is a possibility that a view value blank area still exists.

As described above, if there is a view value blank area, errors may occur when reproducing/rendering an input image based on the MPI layer. Specifically, if there is a view value blank area, an error may occur because pixel values from a different view for the corresponding blank area are used/applied to reproduce/render the input image.

Additionally, referring to the view rays shown in FIGS. 5 and 6, when reproducing/rendering input image A, an error may occur because the pixel value at pixel B2, rather than the pixel value (i.e., color value) at pixel A1, is incorrectly used/applied as the pixel value for photographed point 1. This may be because the point A1 and the point B2 are located at the same view ray based on source A.

In relation to the above-described problem, a method of additionally filling the view value blank area on the view plane according to an embodiment of the present disclosure is proposed through a specific example shown in FIG. 7 below.

Figure 7:
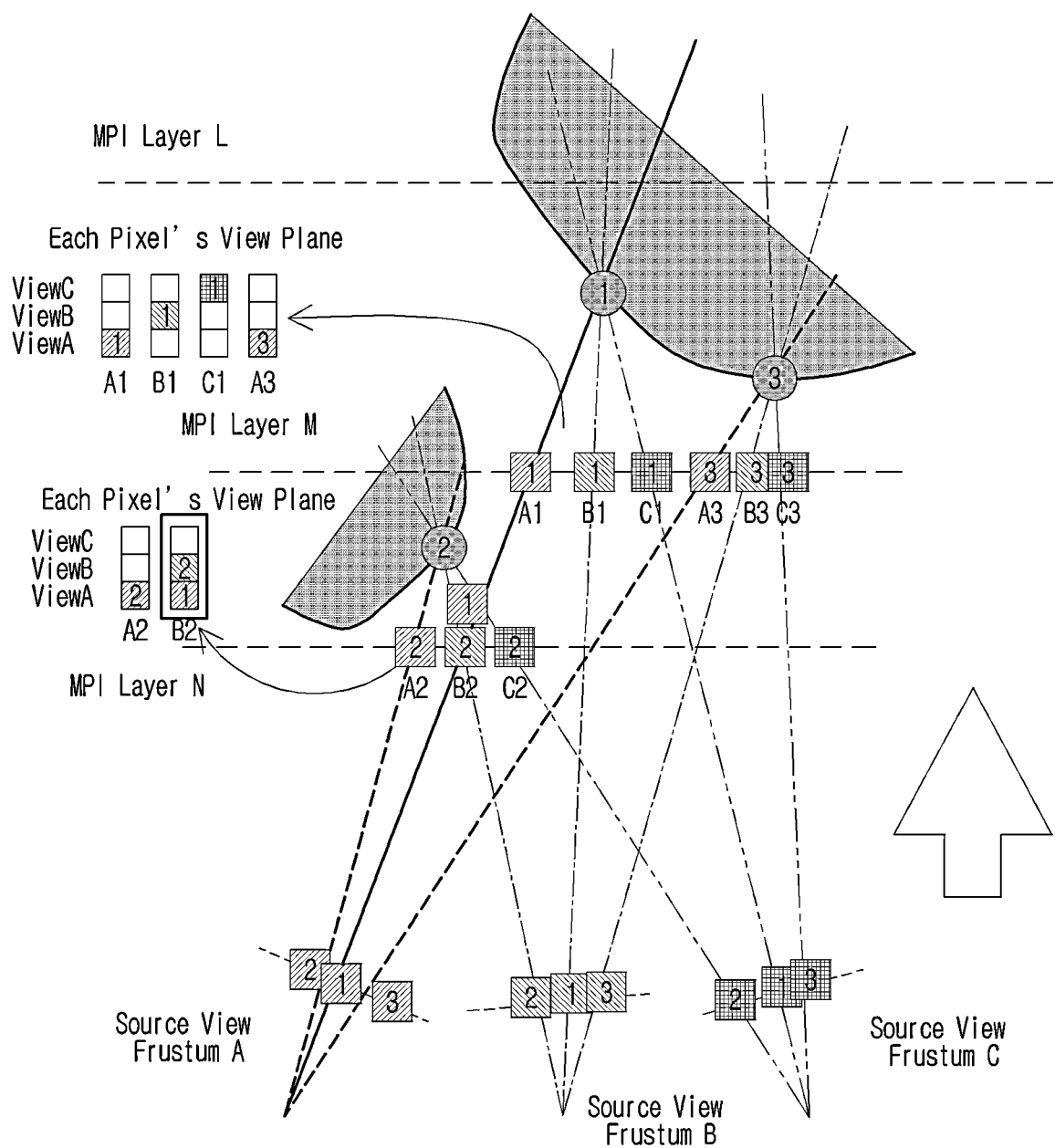
FIG. 7 illustrates a method of filling view value blank areas in the MPI view plane according to an embodiment of the present disclosure.

FIG. 7 illustrates a method of filling view value blank areas in the MPI view plane according to an embodiment of the present disclosure.

Referring to FIG. 7, in relation to MPI view plane data generated based on the method described above in the present disclosure, a method of additionally filling the view value blank area on the view plane of each pixel/point may be considered.

Referring to the points/positions where pixel values are recorded in the MPI layers shown in FIGS. 5 to 7, points where pixels of the original video exist and points where pixels do not exist may be distinguished for each MPI layer.

In this regard, the specific procedure for filling the view value blank area is as follows.

The point of intersection/crossing with the MPI layer may be recalculated for each pixel of each original image. In other words, the point where the pixel value is recorded (i.e., the recording position) in the MPI layer may be recalculated.

The ray path connecting the point and the original video camera is determined, and the points where the ray path intersects all MPI layers closer to the camera than the current MPI layer may be identified.

For intersection/crossing points in the MPI layer confirmed through the above-described method, there may be a layer in which pixel values are recorded when generating MPI view plane data. At this time, it may be determined whether the pixel value for the current camera, that is, the view of the corresponding ray path, is recorded in the view plane of the corresponding point.

At this time, if the pixel value is not recorded, the corresponding view value blank area may be filled with the same pixel value.

Hereinafter, a specific example of the above-described procedure will be described with reference to the example shown in FIG. 7.

The pixel value and view plane at point A1 of MPI layer M may be calculated/checked. For example, when generating an initial MPI layer view plane, the pixel value for view A is recorded at point A1.

A ray path with view A, that is, camera A, for the pixel corresponding to point A1 may be drawn.

Since the point A1 currently exists in the MPI layer M, for all MPI layers lower than the MPI layer M, it may be checked whether the corresponding ray path overlaps the point where the pixel value generated from the image from another camera view is recorded.

Since there is a pixel value generated from the image from view B, that is, camera B, at point B2 of the MPI layer N, and the pixel value from view A is not recorded on the view plane at point B2, the pixel value corresponding to the ray path (i.e., the color value recorded at point A1) may be recorded in the corresponding blank area.

If the above-mentioned procedure is performed on all pixels of the original image, the view value blank area may be filled in the MPI view plane data at the position where the pixel ray path of the original image exists.

By repeating the above-mentioned procedure, all view value blank areas present in the initially generated MPI view plane data (e.g., the view plane of the MPI layer generated according to the procedure described in FIGS. 5 and 6) may be filled.

Using the MPI view plane data generated in this way, a view image that preserves the ray path of the original image may be generated when generating an arbitrary view image.

Accordingly, distortion of the image from any view that may occur depending on the view value blank area may be prevented.

Figure 8:
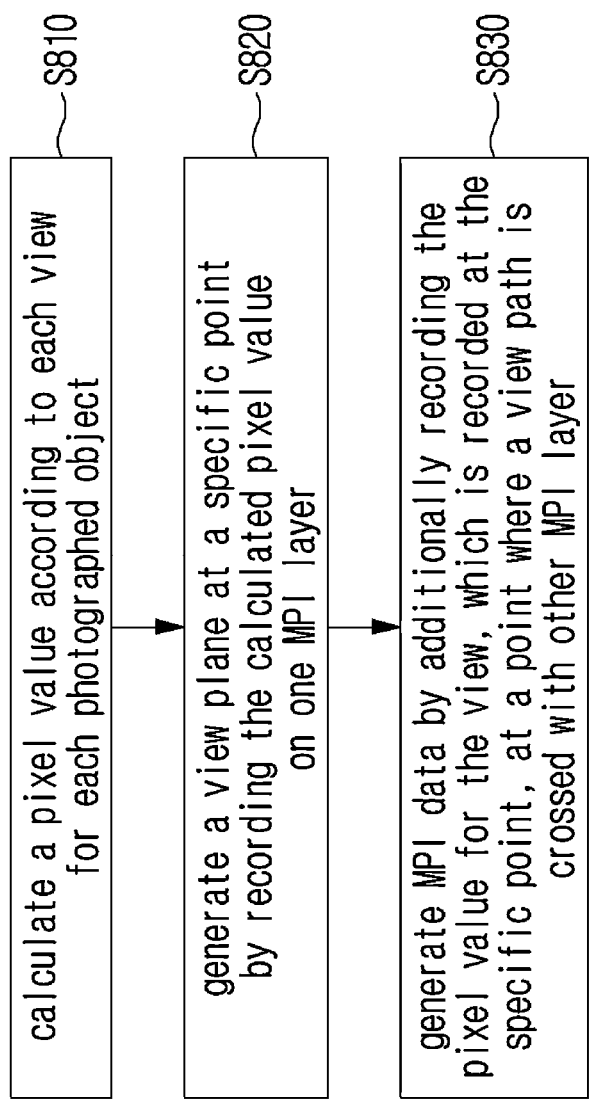
FIG. 8 illustrates a method of generating multi-plane image (MPI) data according to an embodiment of the present disclosure.

FIG. 8 illustrates a method of generating multi-plane image (MPI) data according to an embodiment of the present disclosure.

The operations described in FIG. 8 may be based on a method for generating the MPI view plane data and a method for filling the view value blank area described above in the present disclosure.

In step S810, based on a plurality of input images captured from a plurality of views, pixel values according to each view may be calculated for each photographed object.

Here, the pixel value for each view may correspond to color value information at each view for each photographed object.

Additionally, multiple views are set based on an M×N camera array or N camera array, and M and N may correspond to positive integers greater than or equal to 1.

In step S820, a view plane at a specific point may be generated by recording the calculated pixel value, on one MPI layer determined based on the spatial position of the corresponding photographed object among a plurality of MPI layers.

Here, the specific point may correspond to a point where a path between the photographed object and a view of the recorded pixel value and the one MPI layer are crossed.

For example, a view plane in the MPI layer may be generated according to the operations described above in FIGS. 5 and 6 of the present disclosure.

In this regard, if the spatial position of the photographed object exists between two MPI layers, the one MPI layer may correspond to the MPI layer located closer to the view of the recorded pixel value among the two MPI layers.

Additionally or alternatively, the view plane may comprise one or more pixel values based on one or more views.

In step S830, MPI data may be generated by additionally recording the pixel value for the view, which is recorded at the specific point, at a point where the path intersects/is crossed with the other MPI layer in addition to the one MPI layer.

For example, the view value blank area on the view plane in the MPI layer may be filled according to the operation as described above in FIG. 7 of the present disclosure.

In this regard, the other MPI layer may correspond to an MPI layer having a smaller layer depth value than the one MPI layer among the plurality of MPI layers.

Additionally or alternatively, the pixel value for the view, which is recorded at the specific point, may be additionally recorded when the pixel value for the view is not recorded at the point where the path intersects/is crossed with the other MPI layer.

Additionally or alternatively, the operation of generating the view plane and the additional recording operation of the pixel value may be repeatedly performed at points where the plurality of paths determined based on the plurality of views and the plurality of MPI layers intersect/are crossed.

Additionally or alternatively, the MPI data may correspond to plenoptic multi-plane three-dimensional data having multiple different color values depending on the angle of incidence.

Figure 9:
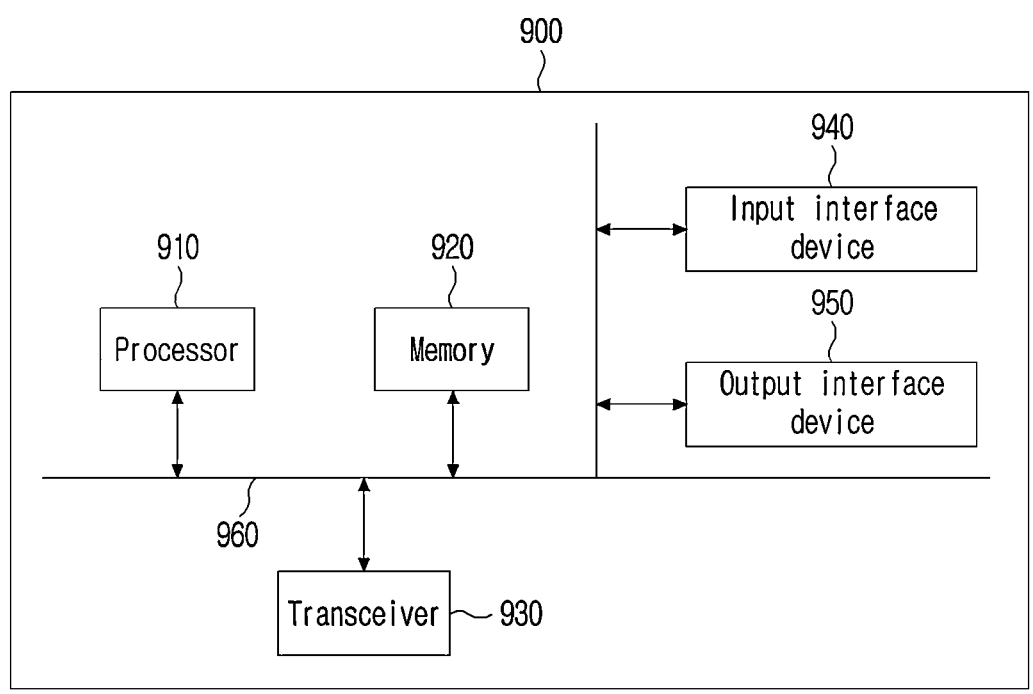
FIG. 9 is a block diagram illustrating a device according to an embodiment of the present disclosure.

FIG. 9 is a block diagram illustrating an apparatus according to an embodiment of the present disclosure.

Referring to FIG. 9, a device 900 may represent a device in which a method for generating MPI view plane data and a method for filling view value blank areas described in the present disclosure is implemented.

For example, the device 900 may generally support/perform the function of recording pixel values (i.e., color values) in an input image to the MPI layer, the function of recording pixel values to generate a view plane at each point/pixel, the function of filling view value blank areas based on the intersection/crossing point between a ray path and a MPI layer, and the like.

The device 900 may include at least one of a processor 910, a memory 920, a transceiver 930, an input interface device 940, and an output interface device 950. Each of the components may be connected by a common bus 960 to communicate with each other. In addition, each of the components may be connected through a separate interface or a separate bus centering on the processor 910 instead of the common bus 960.

The processor 910 may be implemented in various types such as an application processor (AP), a central processing unit (CPU), a graphic processing unit (GPU), etc., and may be any semiconductor device that executes a command stored in the memory 920. The processor 910 may execute a program command stored in the memory 920. The processor 910 may be configured to implement a method for generating MPI view plane data and a method for filling view value blank areas based on FIGS. 1 to 8 described above.

And/or, the processor 910 may store a program command for implementing at least one function for the corresponding modules in the memory 920 and may control the operation described based on FIGS. 1 to 8 to be performed.

The memory 920 may include various types of volatile or non-volatile storage media. For example, the memory 920 may include read-only memory (ROM) and random access memory (RAM). In an embodiment of the present disclosure, the memory 920 may be located inside or outside the processor 910, and the memory 920 may be connected to the processor 910 through various known means.

The transceiver 930 may perform a function of transmitting and receiving data processed/to be processed by the processor 910 with an external device and/or an external system.

The input interface device 940 is configured to provide data to the processor 910.

The output interface device 950 is configured to output data from the processor 910.

The method proposed in the present disclosure may be a method that considers the ray path for each pixel of each input image and fills the view plane at the MPI layer position existing in the ray path using the property that the color of the light in the ray path does not change. Through this, using plenoptic MPI data generated by filling the view value blank area of plenoptic MPI with multi-view color values to the maximum that may be provided by the input image data, there is a new feature that allows the color values of each view of the original image to be maintained as much as possible when combining images from arbitrary views.

According to the present disclosure, a method and apparatus for filling blank areas of the MPI view plane based on pixel ray paths may be provided.

According to the present disclosure, a method and apparatus for filling blank areas of view values that cause distortion when generating an image from an arbitrary view, when generating plenoptic multi-plane image data with multiple color values depending on the angle of incidence using a multi-view input image may be provided.

According to the present disclosure, a method and apparatus for filling color values so that the same color values as the original image may be maintained as much as possible when compositing at an arbitrary view in time, in filling blank areas of the view value on the view plane with color values may be provided.

According to the present disclosure, there is an effect of enabling MPI-based arbitrary view rendering without image distortion due to the view value blank area through a method of filling the viewpoint value blank area.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, it is intended that this disclosure embrace all other substitutions, modifications and variations belong within the scope of the following claims.

What is claimed is:

1. A method of generating multi plane image (MPI) data, the method comprising:
   calculating a pixel value according to each view for each of photographed objects, based on a plurality of input images photographed from a plurality of views;
   generating a view plane at a specific point by recording the calculated pixel value on one MPI layer determined based on a spatial position of a corresponding photographed object among a plurality of MPI layers,
   wherein the specific point corresponds to a point where a path between the corresponding photographed object and a view of the recorded calculated pixel value and the one MPI layer are crossed; and
   generating MPI data by additionally recording the calculated pixel value for the view, which is recorded at the specific point, at a point where the path is crossed with another MPI layer rather than the one MPI layer.

2. The method of claim 1,
   wherein, when the spatial position of the corresponding photographed object exists between two MPI layers, the one MPI layer corresponds to an MPI layer located closer to the view of the recorded calculated pixel value among the two MPI layers.

3. The method of claim 1,
   wherein the view plane comprises one or more pixel values based on one or more views.

4. The method of claim 1,
   wherein the pixel value for each view corresponds to color value information at each view for each of the photographed objects.

5. The method of claim 1,
   wherein the other MPI layer corresponds to an MPI layer having a smaller layer depth value than the one MPI layer among the plurality of MPI layers.

6. The method of claim 1,
   wherein the calculated pixel value for the view, which is recorded at the specific point, is additionally recorded when the calculated pixel value for the view is not recorded at the point where the path is crossed with the other MPI layer.

7. The method of claim 1,
wherein an operation of generating the view plane and an operation of additionally recording the pixel value are repeatedly performed at points where a plurality of paths determined based on the plurality of views are crossed with the plurality of MPI layers.

8. The method of claim 1,
wherein the plurality of views are set based on an M×N camera array or N camera array, and
wherein M and N correspond to positive integers greater than or equal to 1.

9. The method of claim 1,
wherein the MPI data corresponds to plenoptic multi-plane three-dimensional data having a plurality of different color values depending on an angle of incidence.

10. An apparatus for generating multi plane image (MPI) data, the apparatus comprising:
a processor and a memory,
wherein the processor is configured to:
calculate a pixel value according to each of views for each of photographed objects, based on a plurality of input images photographed from a plurality of views;
generate a view plane at a specific point by recording the calculated pixel value on one MPI layer determined based on a spatial position of a corresponding photographed object among a plurality of MPI layers,
wherein the specific point corresponds to a point where a path between the corresponding photographed object and a view of the recorded calculated pixel value and the one MPI layer are crossed; and
generate MPI data by additionally recording the calculated pixel value for the view, which is recorded at the specific point, at a point where the path is crossed with another MPI layer rather than the one MPI layer.

11. The apparatus of claim 10,
wherein, when the spatial position of the corresponding photographed object exists between two MPI layers, the one MPI layer corresponds to an MPI layer located closer to the view of the recorded calculated pixel value among the two MPI layers.

12. The apparatus of claim 10,
wherein the view plane comprises one or more pixel values based on one or more views.

13. The apparatus of claim 10,
wherein the pixel value for each view corresponds to color value information at each view for each of the photographed objects.

14. The apparatus of claim 10,
wherein the other MPI layer corresponds to an MPI layer having a smaller layer depth value than the one MPI layer among the plurality of MPI layers.

15. The apparatus of claim 10,
wherein the calculated pixel value for the view, which is recorded at the specific point, is additionally recorded when the calculated pixel value for the view is not recorded at the point where the path is crossed with the other MPI layer.

16. The apparatus of claim 10,
wherein an operation of generating the view plane and an operation of additionally recording the pixel value are repeatedly performed at points where a plurality of paths determined based on the plurality of views are crossed with the plurality of MPI layers.

17. The apparatus of claim 10,
wherein the plurality of views are set based on an M×N camera array or N camera array, and
wherein M and N correspond to positive integers greater than or equal to 1.

18. The apparatus of claim 10,
wherein the MPI data corresponds to plenoptic multi-plane three-dimensional data having a plurality of different color values depending on an angle of incidence.

19. One or more non-transitory computer readable medium storing one or more instructions,
wherein the one or more instructions are executed by one or more processors and control an apparatus for generating multi plane image (MPI) data to:
calculate a pixel value according to each view for each of photographed objects, based on a plurality of input images photographed from a plurality of views;
generate a view plane at a specific point by recording the calculated pixel value on one MPI layer determined based on a spatial position of a corresponding photographed object among a plurality of MPI layers,
wherein the specific point corresponds to a point where a path between the corresponding photographed object and a view of the recorded calculated pixel value and the one MPI layer are crossed; and
generate MPI data by additionally recording the calculated pixel value for the view, which is recorded at the specific point, at a point where the path is crossed with the other MPI layer rather than the one MPI layer.

20. The computer readable medium of claim 19,
wherein the calculated pixel value for the view, which is recorded at the specific point, is additionally recorded when the calculated pixel value for the view is not recorded at the point where the path is crossed with the other MPI layer.

* * * * *